US008123642B2

United States Patent
Ishikawa et al.

(10) Patent No.: US 8,123,642 B2
(45) Date of Patent: Feb. 28, 2012

(54) HYDRAULIC CONTROL DEVICE FOR AUTOMATIC TRANSMISSION

(75) Inventors: Tomomi Ishikawa, Okazaki (JP); Hiroyuki Kutsubo, Anjo (JP); Tetsuya Shimizu, Anjo (JP); Kenichi Tsuchida, Hazu-gun (JP); Kazunori Ishikawa, Toyota (JP); Naoyuki Fukaya, Okazaki (JP)

(73) Assignee: Aisin AW Co., Ltd., Anjo-shi, Aichi-ken (JP)

( * ) Notice: Subject to any disclaimer, the term of this patent is extended or adjusted under 35 U.S.C. 154(b) by 292 days.

(21) Appl. No.: 12/629,390

(22) Filed: Dec. 2, 2009

(65) Prior Publication Data
US 2010/0162695 A1   Jul. 1, 2010

(30) Foreign Application Priority Data
Dec. 25, 2008   (JP) ................................ 2008-330881

(51) Int. Cl.
*F16H 31/00*   (2006.01)
(52) U.S. Cl. ...................................... 475/116; 475/120
(58) Field of Classification Search .................. 475/116, 475/120
See application file for complete search history.

(56) References Cited

U.S. PATENT DOCUMENTS

| 6,383,115 | B1 | 5/2002 | Kawamura |
| 2002/0086759 | A1* | 7/2002 | Imai et al. ...................... 475/116 |
| 2007/0026990 | A1* | 2/2007 | Takagi ........................... 475/116 |
| 2007/0072726 | A1* | 3/2007 | Dell'Eva et al. ............... 475/116 |

FOREIGN PATENT DOCUMENTS

| JP | 63210445 | 9/1988 |
| JP | 2007064285 | 3/2007 |
| JP | 2007-271058 | 10/2007 |

* cited by examiner

*Primary Examiner* — Edwin A Young
(74) *Attorney, Agent, or Firm* — Bacon & Thomas, PLLC

(57) ABSTRACT

A hydraulic control device for an automatic transmission, including: a hydraulic pressure source; a plurality of friction engagement elements; a line pressure regulating valve that regulates hydraulic pressure from the hydraulic pressure source to a predetermined line pressure; a plurality of operation pressure regulating valves that regulate the line pressure as operation pressure for a hydraulic servo operating a friction engagement element; a maximum pressure conducting circuit that feeds a maximum pressure, among the operation pressures, to the line pressure regulating valve, wherein the friction engagement elements are engaged and released to achieve a plurality of forward speeds and a reverse speed, and the line pressure regulating valve regulates the line pressure during forward travel based on the maximum operation pressure, and regulates the line pressure during reverse travel based on the operation pressure input from a specific operation pressure regulating valve.

9 Claims, 3 Drawing Sheets

| | C-1 | C-2 | C-3 | B-1 | B-3 | F-2 |
|---|---|---|---|---|---|---|
| 1ST | O | | | | (O) | O |
| 2ND | O | | | O | | |
| 3RD | O | O | | | | |
| 4TH | | O | | O | | |
| REV | | | O | | O | |

(O): ENGINE BRAKE IN OPERATION

HYDRAULIC CONTROL DEVICE FOR AUTOMATIC TRANSMISSION

INCORPORATION BY REFERENCE

The disclosure of Japanese Patent Application No. 2008-330881 filed on Dec. 25, 2008 including the specification, drawings and abstract is incorporated herein by reference in its entirety.

BACKGROUND OF THE INVENTION

The present invention relates to a hydraulic control device for an automatic transmission installed in a vehicle such as an automobile or service vehicle. More specifically, the present invention relates to a hydraulic control device for an automatic transmission having a plurality of forward speeds and at least one reverse speed.

DESCRIPTION OF THE RELATED ART

An automatic transmission installed in a vehicle is generally structured so as to regulate a hydraulic pressure generated by an oil pump to a line pressure, that is, a source pressure of each hydraulic control device, using a regulating value such as a primary regulator valve. The regulating valve is formed so as to always regulate the line pressure to a constant pressure, and may regulate the line pressure based on a signal pressure from a linear solenoid valve for line pressure control, which outputs the signal pressure in accordance with the throttle opening.

A conventional toroidal type continuously variable transmission has an input disc, an output disc, and a power roller held between both discs, and changes speeds by controlling the position of the power roller. A hydraulic control device proposed for such a toroidal type continuously variable transmission is provided with a hierarchy of a plurality of pilot shuttle check valves. Among operation pressures regulated as engagement pressures of friction engagement elements by a plurality of linear solenoid valves for shifting in the hydraulic control device, a maximum operation pressure is guided to the primary regulator valve and the maximum operation pressure is used as the above signal pressure (see Japanese Patent Application Publication No. JP-A-2007-271058 for an example).

In other words, the hydraulic control device has two input ports, one output port, and a check ball into which the operation pressures of the input ports are opposingly input. By moving the check ball using a pressure difference, the input port on the low-pressure side is cut off and the input port on the high-pressure side and the output port communicate with the pilot shuttle check valves. This combination inputs the maximum pressure among the plurality of operation pressures to the regulating valve, and regulates the oil pressure generated by the oil pump so that the line pressure increases more than the maximum operation pressure by a predetermined amount.

SUMMARY OF THE INVENTION

However, regulating the line pressure to a constant pressure increases the volume of oil consumption for constantly maintaining the line pressure to a high pressure, and results in poor energy efficiency. A linear solenoid valve for line pressure control can be introduced in order to increase fuel efficiency while avoiding unnecessary increases to the line pressure, but this leads to higher costs, and also increases the size of the hydraulic control device.

Alternatively, the hydraulic control device may be structured such that the maximum operation pressure among the operation pressures output from the linear solenoid valves for shifting is guided to the regulating valve, and the line pressure increases more than the maximum operation pressure by a predetermined amount. Consequently, the required engagement pressure can be prevented from falling below the line pressure, and the solenoid valve for line pressure control can be eliminated. However, in the continuously variable transmission as described in JP-A-2007-271058, operation pressure is constantly output from the plurality of solenoid valves in regardless of whether the vehicle is going forward or in reverse, and the maximum operation pressure is always selected (switched to). In other words, if the pressure balance of operation pressures supplied to the input ports of the pilot shuttle check valves is changed to switch to the input port on the high-pressure side, the maximum operation pressure is switched from the input port on the original low-pressure side cut off by the check ball to the input port on the original high-pressure side.

While moving the check ball, however, the original maximum operation pressure is actually still output as the signal pressure to the regulating valve from the output port despite switching the maximum operation pressure supplied to the input port, and may temporarily lower the line pressure. Therefore, switching of the maximum operation pressure should be minimized as much as possible.

If the hydraulic control device is used for an automatic transmission having a plurality of forward speeds and one reverse speed, there is no need to select the maximum operation pressure from the operation pressures of the plurality of linear solenoid valves in the reverse speed as well as in the forward speeds, as described in the continuously variable transmission of JP-A-2007-271058, because there is only one gear speed when traveling in reverse.

Hence, the present invention provides a hydraulic control device for an automatic transmission having a plurality of forward speeds and one reverse speed that solves the above problems by regulating a line pressure based on an operation pressure input from a specific operation pressure regulating valve while in the reverse speed.

According to a first aspect of the present invention, a line pressure is regulated during forward travel based on a maximum operation pressure output from a maximum pressure conducting circuit, and the line pressure is regulated during reverse travel based on operation pressure from a specific operation pressure regulating valve. Therefore, hydraulic pressure generated by a hydraulic pressure source can be regulated to a suitable line pressure without providing a linear solenoid valve exclusively for line pressure control. In addition, the operation pressure from the specific linear solenoid valve during reverse travel is output to and regulated by a line pressure regulating valve. Therefore, switching of the maximum operation pressure in the maximum pressure conducting circuit can be lessened to reduce temporary drops in the line pressure.

According to a second aspect of the present invention, by setting the source pressure of the specific operation pressure regulating valve as the line pressure, the specific operation pressure regulating valve can output the operation pressure as a signal pressure to the line pressure regulating valve even during reverse travel. Therefore, switching of the maximum operation pressure in the maximum pressure conducting circuit can be lessened to reduce temporary drops in the line pressure.

According to a third aspect of the present invention, a switching valve is interposed between the specific operation pressure regulating valve and a hydraulic servo thereof, and allows the operation pressure from the specific operation pressure regulating valve to be input to the hydraulic servo during forward travel and cuts off the supply of operation pressure during reverse travel. Therefore, if the operation pressure from the specific operation pressure regulating valve is output as the signal pressure for controlling the line pressure regulating valve during reverse travel, it is possible to suppress supplying the operation pressure to the hydraulic servo and engaging the friction engagement element by mistake.

According to a fourth aspect of the present invention, the specific operation pressure regulating valve is an operation pressure regulating valve that is only used for forward travel for shifting and is not used for reverse travel. Thus, even for an automatic transmission in which the operation pressure is not output from the operation pressure regulating valve during reverse travel, the signal pressure can be output from the specific operation pressure regulating valve not in use to the line pressure regulating valve, in order to regulate the hydraulic pressure generated by the hydraulic pressure source to the line pressure.

According to a fifth aspect of the present invention, the operation pressure supplied to the hydraulic servo of the friction engagement element whose engagement pressure is higher than for other friction engagement elements because it is frequently used and constantly engaged at low speeds can be output, by one input to the shuttle valve, as the maximum operation pressure to the line pressure regulating valve. Therefore, switching of the maximum operation pressure can be lessened to reduce temporary drops in the line pressure.

DETAILED DESCRIPTION OF THE EMBODIMENTS

Figure 1:
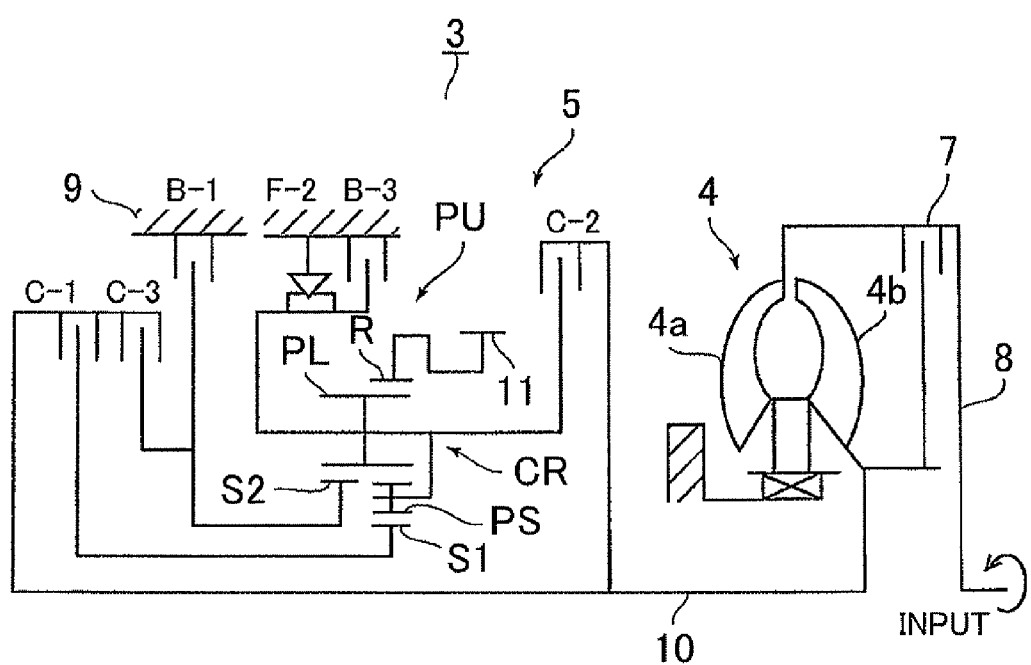
FIG. 1 is a skeleton diagram that shows an automatic transmission according to the present invention.

Embodiments of the present invention will be described below with reference to FIGS. 1 to 3.
General Configuration of Automatic Transmission First, the overall configuration of an automatic transmission that can apply the present invention will be explained with reference to FIG. 1. As illustrated in FIG. 1, an automatic transmission 3 is well suited for use in a front-engine, front-wheel-drive (FF) vehicle, and has an input shaft 8 whereby the automatic transmission 3 can be connected to an engine. A torque converter 4 and an automatic speed change mechanism 5 are also provided centered around the axial direction of the input shaft 8.

The torque converter 4 has a pump impeller 4a that is connected to the input shaft 8 of the automatic transmission 3, and a turbine runner 4b to which the rotation of the pump impeller 4a is transmitted via a working fluid. The turbine runner 4b is connected to an input shaft 10 of the automatic speed change mechanism 5, which is coaxially disposed with the input shaft 8. Also, the torque converter 4 is provided with a lock-up clutch 7. Engagement of the lock-up clutch 7 directly transmits the rotation of the input shaft 8 of the automatic transmission 3 to the input shaft 10 of the automatic speed change mechanism 5.

The automatic speed change mechanism 5 is provided with a planetary gear unit PU on the input shaft 10. The planetary gear unit PU includes, as four rotating elements, a sun gear S1, a sun gear S2, a carrier CR, and a ring gear R. The planetary gear unit PU is a so-called Ravigneaux type planetary gear in which a long pinion PL that meshes with the sun gear S2 and the ring gear R and a short pinion PS that meshes with the sun gear S1 both mesh with the carrier CR.

The sun gear S2 of the planetary gear unit PU is connected to a brake B-1 and held stationary with respect to a transmission case 9. The sun gear S2 is also connected to a clutch C-3, and can be input with the rotation of the input shaft 10 through the clutch C-3. The sun gear S1 connected to a clutch C-1, and can be input with the rotation of the input shaft 10.

The carrier CR is connected to a clutch C-2 into which the rotation of the input shaft 10 is input and can be input with the rotation of the input shaft 10 through the clutch C-2. The carrier CR is also connected to a one-way clutch F-2 and a brake B-3. Rotation is restricted by the one-way clutch F-2 to rotation in one direction in relation to the transmission case 9, and rotation is held stationary by the brake B-3. The ring gear R is connected to a counter gear 11, and the counter gear 11 is connected to a drive wheel through a counter shaft and a differential device not shown in the drawing.

Figures 2A, 2B:
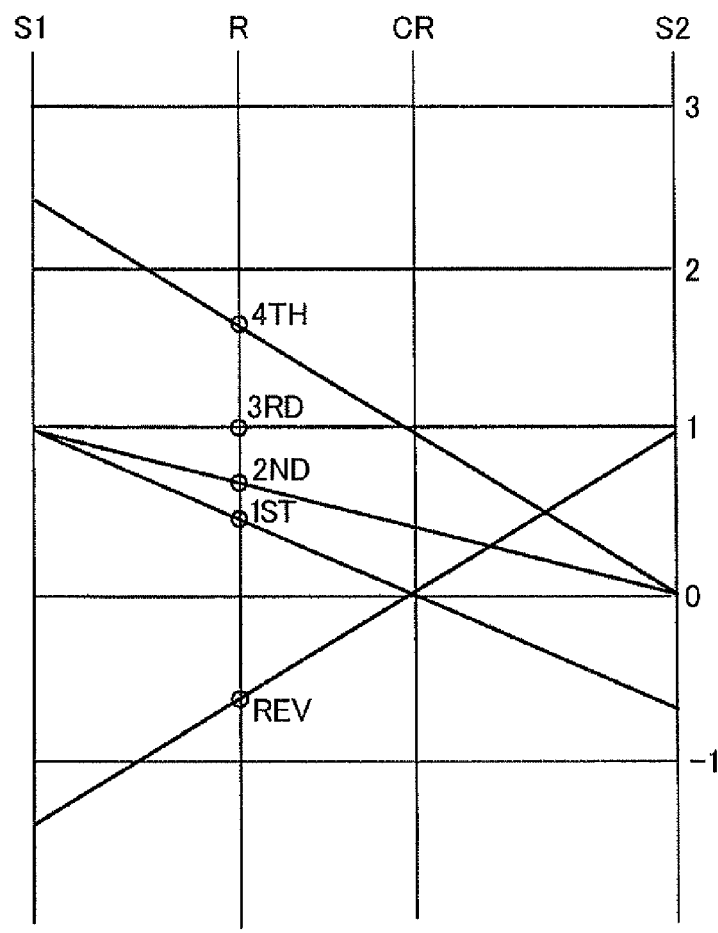
FIG. 2A is an engagement chart for the automatic transmission.
FIG. 2B is a speed line map for the automatic transmission.

FIG. 2A shows an operation chart illustrating the relation of each clutch and brake with each speed, and FIG. 2B shows a speed line map of each speed. The automatic transmission above operates the clutches and brakes in the combinations shown in the operation chart so as to form gear speeds for first to fourth forward speed and a first reverse speed.
Configuration of Hydraulic Control Device A hydraulic control device 1 for the automatic transmission according to the present invention will be described next. Note that in order to describe spool positions in the present embodiment, the position on the right side of the valves shown in FIG. 3 will be referred to as a "right-hand position" and the position on the left side of the valves will be referred to as a "left-hand position".

Figure 3:
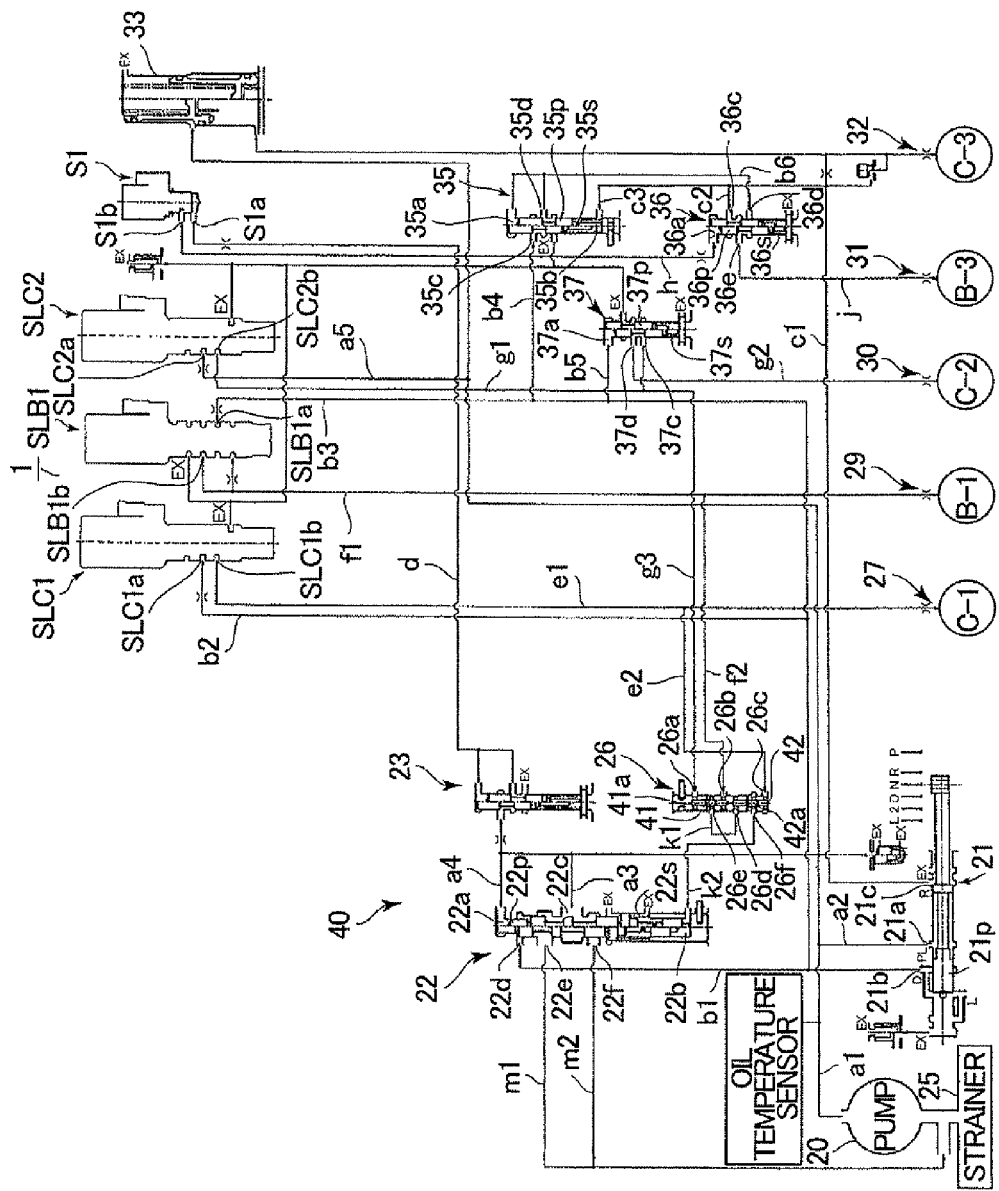
FIG. 3 is a circuit diagram that shows a hydraulic control device of the automatic transmission according to the present invention.

As shown in FIG. 3, the hydraulic control device 1 includes an oil pump 20, a manual shift valve 21, a primary regulator valve 22, and a solenoid modulator valve 23. When the engine is started, the oil pump 20, which is rotationally and drivingly connected to the pump impeller 4a of the torque converter 4, is driven in association with the rotation of the engine and generates a hydraulic pressure in the form of siphoning oil through a strainer 25 from an oil pan.

The hydraulic pressure generated by the oil pump 20 will be described in detail later. This hydraulic pressure is regulated to a line pressure $P_L$ while also discharged and regulated by the primary regulator valve 22, based on a signal pressure $P_{SIG}$ from a signal check valve 26 or the like. Such hydraulic pressure is supplied to the manual shift valve 21, the solenoid modulator valve 23, a linear solenoid valve SLC2 and so forth. The line pressure PL supplied to the solenoid modulator valve 23 is regulated by the valve 23 to a modulator pressure $P_{MOD}$ that is generally constant, and the modulator pressure $P_{MOD}$ is supplied as a source pressure to a solenoid valve S1.

Meanwhile, the manual shift valve (range switching valve) 21 has a spool 21p that is mechanically (or electrically) driven by a shift lever provided near the driver seat (not shown). The position of the spool $21p$ is switched depending on the shift range (e.g. P, R, N, D) selected by the shift lever, which sets the output state and non-output (drain) state of the line pressure $P_L$ that is input to an input port $21a$ through an oil passage $a2$ or the like.

More specifically, if the shift lever is operated to the D range, based on the position of the spool $21p$, the input port $21a$ communicates with a forward-range pressure output port $21b$ and the line pressure $P_L$ is output as a forward-range pressure (D-range pressure) $P_D$ from the forward-range pressure output port $21b$. If the shift lever is operated to the Reverse (R) range, based on the position of the spool $21p$, the input port $21a$ communicates with a reverse-range pressure output port $21c$ and the line pressure $P_L$ is output as a reverse-range pressure (R-range pressure) $P_{REV}$ from the reverse-range pressure output port $21c$. Furthermore, if the shift lever is operated to the P range or the N range, the input port $21a$ cut off from the forward-range pressure output port $21b$ and the reverse-range pressure output port $21c$ by the spool $21b$. The forward-range pressure output port $21b$ and the reverse-range pressure output port $21c$ instead communicate with a drain port EX, that is, a non-output state is achieved in which the D-range pressure $P_D$ and the R-range pressure $P_{REV}$ are drained (discharged).

A portion that executes a shift control will be described next. The hydraulic control device 1 has a total of five hydraulic servos: a hydraulic servo 27 for the clutch C-1, a hydraulic servo 29 for the brake B-1, a hydraulic servo 30 for the clutch C-2, a hydraulic servo 31 for the brake B-3, and a hydraulic servo 32 for the clutch C-3. Among the hydraulic servos 27, 29, 30, 31, 32, the hydraulic servos 27, 29, 30 of the clutch C-1, the brake B-1, and the clutch C-2, which are only engaged during forward travel, are directly supplied with operation pressures serving as engagement pressures that have been regulated by three linear solenoid valves SLC1, SLB1, SLC2. The hydraulic servo 32 of the clutch C-3 used during reverse travel is directly supplied with the R-range pressure $P_{REV}$ through an oil passage c1. Note that the oil passage c1 is connected to a C-3 accumulator 33, and the R-range pressure $P_{REV}$ supplied as an engagement pressure $P_{C3}$ of the clutch C-3 is regulated so as to balance the line pressure $P_L$ and be suitable for use as the engagement pressure of the clutch C-3.

The hydraulic servo 31 of the brake B-3 is formed so as to be supplied with either the D-range pressure $P_D$ or the R-range pressure $P_{REV}$ as an engagement pressure $P_{B3}$, and includes a solenoid valve S1, a B-3 control valve 35, and a B-3 relay valve 36 that are portions used for switching the engagement pressure to either the D-range pressure $P_D$ or the R-range pressure $P_{REV}$.

Oil passages b2, b3, b4, b5 shown in FIG. 3 are formed connected to the forward-range pressure output port $21b$ of the manual shift valve 21 to enable input of the forward-range pressure $P_D$ to the oil passages. Oil passages c1, c2, c3 are formed connected to the reverse-range pressure output port $21c$ of the manual shift valve 21 to enable input of the reverse-range pressure $P_{REV}$ to the oil passages. An oil passage a5 is input with the line pressure $P_L$ from the primary regulator valve 22, and an oil passage d is input with the modulator pressure $P_{MOD}$ from the solenoid modulator valve 23.

The linear solenoid valve SLC1 has an input port SLC1$a$ that is input with the D-range pressure $P_D$ through the oil passage b2 and the like, and an output port SLC1$b$ that regulates the D-range pressure $P_D$ and outputs an operation pressure $P_{SLC1}$ as an engagement pressure $P_{C1}$ to the hydraulic servo 27. In other words, when current is conducted based on a command value from a control unit ECU (not shown), the linear solenoid valve SLC1 is configured so as to output the engagement pressure $P_{C1}$ in accordance with the command value. The output port SLC1$b$ of the linear solenoid valve SLC1 is connected to the hydraulic servo 27 of the first clutch C-1 through an oil passage c1.

The linear solenoid valve SLB1 has an input port SLB1$a$ that is input with the D-range pressure $P_D$ through the oil passage b3 and the like, and an output port SLB1$b$ that regulates the D-range pressure $P_D$ and outputs an operation pressure $P_{SLB1}$ as an engagement pressure $P_{B1}$ to the hydraulic servo 29. In other words, when current is conducted based on a command value from the control unit, the linear solenoid valve SLB1 is configured so as to output the engagement pressure $P_{B1}$ in accordance with the command value. The output port SLB1$b$ of the linear solenoid valve SLB1 is connected to the hydraulic servo 29 of the brake B-1 through an oil passage f1.

The linear solenoid valve SLC2 has an input port SLC2$a$ that is input with the line pressure $P_L$ through the oil passage a5 and the like, and an output port SLC2$b$ that regulates the line pressure $P_L$ and outputs an operation pressure $P_{SLC2}$ as an engagement pressure $P_{C2}$ to the hydraulic servo 30. In other words, when current is conducted based on a command value from the control unit, the linear solenoid valve SLC2 is configured so as to output the engagement pressure $P_{C2}$ in accordance with the command value. The output port SLC2$b$ of the linear solenoid valve SLC2 is connected to the hydraulic servo 30 of the clutch C-2 through an oil passage g1, more specifically, through a C-2 relay valve 37 and an oil passage g2 described later.

The solenoid valve S1 has an input port S1$a$ that is input with the modulator pressure $P_{MOD}$ through the oil passage d, and an output port S1$b$ that outputs the modulator pressure $P_{MOD}$ generally unchanged as a signal pressure $P_{S1}$ when current is conducted (that is, when turned on). The output port S1$b$ is connected to an oil chamber $36a$ of the B-3 relay valve 36 through an oil passage h.

The B-3 control valve 35 has a spool $35p$ and a spring $35s$ that biases the spool $35p$ upward. The B-3 control valve 35 also includes an oil chamber $35a$ provided above the spool $35p$ in the drawing and an oil chamber $35b$ provided below the spool $35p$ in the drawing, as well as an input port $35c$, a drain port EX, and an output port $35d$.

The B-3 control valve 35 is configured such that when set to the left-hand position by the biasing force of the spring $35s$, the input port $35c$ communicates with the output port $35d$; when set to the right-hand position, the output port $35d$ communicates with the drain port EX so that the hydraulic pressure of the oil passage b6 is discharged, and the input port $35c$ supplied with the D-range pressure $P_D$ is cut by the spool $35p$. Furthermore, if the output port $35d$ is in communication with the input port $35c$, the D-range pressure $P_D$ is supplied to the oil chamber $35a$. The D-range pressure $P_D$ and the biasing force of the spring $35s$ balance one another so that a constant D-range pressure $P_D$ is always output from the output port $35d$.

The B-3 relay valve 36 has a spool $36p$ and a spring $36s$ that biases the spool $36p$ upward in the drawing. The B-3 relay valve 36 also includes an oil chamber $36a$ provided above the spool $36p$ in the drawing, as well as an input port $36c$, an input port $36d$, and an output port $36e$.

During forward travel the signal pressure $P_{S1}$ from the solenoid S1 is supplied to the oil chamber $36a$ through the oil passage h to set the B-3 relay valve 36 to the left-hand position against the biasing force of the spring $36s$, and at such time, the input port $36d$ communicates with the output port $36e$, while the input port 36e is cut off. During reverse travel the signal pressure $P_{S1}$ from the solenoid S1 is not supplied to the oil chamber 36a so that the B-3 relay valve 36 is set to the right-hand position by the biasing force of the spring 36s, and at such time, the input port 36c communicates with the output port 36e, while the input port 36d is cut off.

The output port 36e of the B-3 relay valve 36 is connected to the hydraulic servo 31 of the brake B-3 through an oil passage j. If the signal pressure $P_{S1}$ from the solenoid S1 is output and the B-3 relay valve 36 set to the left-hand position, the D-range pressure $P_D$ is output to the hydraulic servo 31 of the brake B-3 through the oil passages b6, j. Meanwhile, if the B-3 relay valve 36 is set to the right-hand position, the R-range pressure $P_{REV}$ is output to the hydraulic servo 31 of the brake B-3 through the oil passages c2, j.

Detailed Configuration of Line Pressure Regulating Portion

The detailed configuration of a line pressure regulating portion 40 that is a main element of the present invention will be described next. The hydraulic pressure generated by the oil pump 20 as described above is regulated to the line pressure $P_L$ by the primary regulator valve 22, based on the signal pressure $P_{SIG}$ from the signal check valve 26. The constitution of the line pressure regulating portion 40 that regulates the line pressure $P_L$, includes: the primary regulator valve 22; the signal check valve 26; the linear solenoid valves SLC1, SLB1, SLC2 that regulate the operation pressures (engagement pressures) serving as the source pressure of the signal pressure $P_{SIG}$ from the signal check valve 26; and the manual shift valve 21. In addition, for the signal pressure $P_{SIG}$, a maximum pressure conducting circuit formed from the oil passages e2, f2, g3, k1, k2 and the signal check valve 26 selects the maximum operation pressure among the operation pressures $P_{SLC1}$, $P_{SLB1}$, $P_{SLC2}$ of the plurality of linear solenoid valves SLC1, SLB1, SLC2.

The signal check valve 26 is formed by integratedly combining a first shuttle valve 41 and a second shuttle valve 42 in a hierarchical manner at the same position (hole) of the hydraulic control device (control valve) 1. The signal check valve 26 also includes four input ports 26a, 26b, 26c, 26d and two output ports 26e, 26f. The first and second shuttle valves 41, 42 have two input ports and one output port, and are formed such that the output port communicates with the input port having the maximum pressure. Therefore, the final output port 26f of the signal check valve 26 is in communication with the input port with the highest pressure among the input ports 26a, 26b, 26c. Note that the first and second shuttle valves 41, 42 need not be provided at the same position in the hydraulic control device 1. The first and second shuttle valves 41, 42 may be disposed at any position in the hydraulic circuit provided that they are hierarchically combined.

The first shuttle valve 41 has the input port 26a, the input port 26b, and the output port 26e. The input port 26a is supplied with the engagement pressure $P_{C2}$ operation pressure $P_{SLC2}$) of the clutch C-2 through an oil passage g3, and the input port 26b is supplied with the engagement pressure $P_{B1}$ (operation pressure $P_{SLB1}$) of the brake B-1 through an oil passage f2. The engagement pressures $P_{C2}$, $P_{B1}$ are input against a check ball 41a that is a pressure receiving member. The check ball 41a is moved in one of two directions depending on the pressure difference between the engagement pressures $P_{C2}$, $P_{B1}$ to either block the input ports 26a, 26b having a lower hydraulic pressure, or communicate the input ports 26a, 26b having a higher hydraulic pressure with the output port 26e.

Similar to the first shuttle valve 41, the second shuttle valve 42 has the input port 26c, the input port 26d, and the output port 26f. The input port 26d is connected to the output port 26e of the first shuttle valve 41 through the oil passage k1. Therefore, the input port 26d is supplied with the higher hydraulic pressure among the engagement pressure $P_{C2}$ of the clutch C-2 and the engagement pressure $P_{B1}$ of the brake B-1, and the input port 26c is supplied with the engagement pressure $P_{C1}$ (operation pressure $P_{SLC1}$) of the clutch C-1 through the oil passage e2. The engagement pressures $P_{C1}$, $P_{C2}$, $P_{B1}$ are input against a check ball 42a that is a pressure receiving member. The check ball 42a is moved in one of two directions depending on the pressure difference among the engagement pressures $P_{C1}$, $P_{C2}$, $P_{B1}$ to block either the input port 26c or 26d having a lower hydraulic pressure, and communicate either the input port 26c or 26d having a higher hydraulic pressure with the output port 26f.

As shown in FIG. 2A, the clutch C-1 is a clutch that is always engaged for gear speeds on the low speed side that require a large drive torque. The clutch C-1 is frequently used, and the engagement pressure $P_{C1}$ is often higher than the engagement pressures $P_{C2}$, $P_{B1}$ of the clutch C-2 and the brake B-1. Therefore, the signal check valve 26 is configured such that the engagement pressure $P_{C1}$ of the clutch C-1 can be output as the signal pressure $P_{SIG}$ of the signal check valve 26 from the output port 26f after one comparison, and input to the input port 26c of the second shuttle valve 42.

Note that in order to prevent the check balls from stopping around the center portion and cutting of both the output ports 26e, 26f when identical engagement pressures are input to the input ports 26a, 26b, 26c, 26d, the first and second shuttle valves 41, 42 may be provided with a weak spring or the like so that the check balls 41a, 42a are slightly biased to one side.

The C-2 relay valve 37 is provided between the linear solenoid valve SLC2 that regulates the engagement pressure $P_{C2}$ of the clutch C-2 and the hydraulic servo 30 of the clutch C-2. The C-2 relay valve 37 has a spool 37p, a spring 37s that biases the spool 37p upward, an input port 37c, an output port 37d, and a drain port EX. An oil chamber 37a is also provided above the spool 37p in the drawing.

During forward travel the D-range pressure $P_D$ is supplied to the oil chamber 37a through the oil passage b5 and the like to set the C-2 relay valve 37 to the left-hand position against the biasing force of the spring 37s, and at such time, the input port 37c communicates with the output port 37d. During reverse travel the D-range pressure $P_D$ is not supplied to the oil chamber 37a so that the C-2 relay valve 37 is set to the right-hand position by the biasing force of the spring 37s, and at such time, the input port 37c is cut off. In other words, during reverse travel the engagement pressure $P_{C2}$ output from the solenoid valve SLC2 is not supplied to the hydraulic servo 30 of the clutch C-2, and is only output to the input port 26a of the signal check valve 26 through the oil passage g3.

The primary regulator valve 22 has a spool 22p and a spring 22s that biases the spool 22p upward. The primary regulator valve 22 also includes an oil chamber 22a provided above the spool 22p in the drawing and an oil chamber 22b provided below the spool 22p in the drawing, as well as an input port 22c, an output port 22d, and two drain ports 22e, 22f that discharge excessive hydraulic pressure from the oil pump 20.

The hydraulic pressure (line pressure $P_L$) generated by the oil pump 20 is supplied to the input port 22c through the oil passage a3. The primary regulator valve 22 is configured such that if the spool 22p is set to the right-hand position, the input port 22c communicates with the drain ports 22e, 22f, and hydraulic pressure from the drain ports 22e, 22f flows back to the oil pan through oil passages m1, m2; and if the spool 22p is set to the left-hand position, communication between the input port 22c and the drain ports 22e, 22f is cut off.

In addition, the input port 22d is supplied with the D-range pressure $P_D$ through the oil passage b1, the oil chamber 22a is supplied with the line pressure $P_L$ through the oil passage a4, and the oil chamber 22b is supplied with the signal pressure $P_{SIG}$ from the signal check valve 26 through the oil passage k2. During forward travel, the spool 22p stops at a position that balances the line pressure $P_L$ of the oil chamber 22a and the forward-range pressure $P_D$ of the input port 22d, which are downward pressures in the drawing, with the biasing force of the spring 22s and the signal pressure $P_{SIG}$ of the oil chamber 22b, which are upward pressures in the drawing. During reverse travel, the spool 22p stops at a position that balances the line pressure $P_L$ of the oil chamber 22a, which is a downward pressure in the drawing, with the biasing force of the spring 22s and the signal pressure $P_{SIG}$ of the oil chamber 22b, which are upward pressures in the drawing.

Operation of Hydraulic Control Device

The operation of the hydraulic control device 1 according to the present embodiment will be described next focusing mainly on the line pressure regulating portion 40. The hydraulic control of the hydraulic control device 1 starts when the driver turns on the ignition, for example. Once the engine starts, hydraulic pressure is generated by the rotation of the oil pump 20, which is based on the engine rotation. The hydraulic pressure is then input to the oil chamber 22a and the input port 22c of the primary regulator valve 22 through the oil passages a3, a4. The spool 22p thus moves to the position that balances the hydraulic pressure supplied to the oil chamber 22a with the biasing force of the spring 22s. If the hydraulic pressure generated by the oil pump 20 is excessively high, the excessive hydraulic pressure is discharged from the drain ports 22e, 22f and regulated to the line pressure $P_L$. The line pressure $P_L$ is subsequently input to the input port 21a of the manual shift valve 21 through the oil passage a2, and input to the input port SLC2a of the linear solenoid valve SLC2 through the oil passage a5.

When the driver moves the shift lever from the N-range position to the D-range position, for example, and the forward first speed is determined by a control unit (not shown), the forward-range pressure $P_D$ is output from the forward-range pressure output port 21b of the manual shift valve 21 to the oil passages b1 to b5. The operation pressure $P_{SLC1}$ is thus output as the engagement pressure $P_{C1}$ of the hydraulic servo 27 from the linear solenoid valve SLC1 through the oil passage e1, and the clutch C-1 engaged. Consequently, the engagement of the clutch C-1 in combination with the engagement of the one-way clutch F-2 achieves the first forward speed.

When the engagement pressure $P_{C1}$ is output from the linear solenoid valve SLC1 to the hydraulic servo 27 through the oil passage e1, the engagement pressure $P_{C1}$ is also input to the input port 26c of the signal check valve 26 through the oil passage e2, which branches off from a middle portion of the oil passage e1. The operation pressures $P_{SLB1}$, $P_{SLC2}$ are thus not output from the linear solenoid valves SLB1, SLC2 in the forward first speed. Therefore, the engagement pressure $P_{C1}$ is input as the signal pressure $P_{SIG}$ to the oil chamber 22b of the primary regulator valve 22 through the oil passage k2, and the primary regulator valve 22 regulates the line pressure $P_L$ so as to be higher than the signal pressure $P_{SIG}$ by a predetermined amount.

Note that the primary regulator valve 22 is input with the D-range pressure $P_D$ from the input port 22d, and is configured so as to regulate the line pressure $P_L$ relatively lower during forward travel compared to reverse travel because the D-range pressure $P_D$ biases the spool downward in the figure.

Engine Brake Operation in First Forward Speed

If the control unit determines use of the engine brake in the first forward speed, for example, an electric command from the control unit causes the signal pressure $P_{S1}$ to be output from the solenoid valve S1 to the oil chamber 36a of the B-3 relay valve 36. The spool 36 is thus switched to the left-hand position against the biasing force of the spring 36s so that the input port 36d communicates with the output port 36e. In addition, the spool 35p of the B-3 control valve 35 is in the left-hand position due to the biasing force of the spring 35s. Therefore, the D-range pressure $P_D$ is output from the output port 35d to the input port 36d of the B-3 relay valve 36 through the oil passage b6. The D-range pressure $P_D$ is supplied as the engagement pressure $P_{B3}$ from the output port 36e of the B-3 relay valve 36 to the hydraulic servo 31 through the oil passage j, and the brake B-3 engaged. Consequently, the engagement of the brake B-3 in combination with the engagement of the clutch C-1 achieves engine braking in the first forward speed.

Operation in Second Forward Speed

If the control unit determines that the state of the first forward speed has been switched to the second forward speed, for example, an electric command from the control unit causes a pressure regulating control to be executed for the linear solenoid valve SLB1 while maintaining the regulated pressure state of the linear solenoid valve SLC1. In other words, if the linear solenoid valve SLB1 is subjected to a pressure regulating control, the operation pressure $P_{SLB1}$ is output as the engagement pressure $P_{B1}$ from the output port SLB1b and input to the hydraulic servo 29 through the oil passage f1, and the brake B-1 engaged. Consequently, the engagement of the brake B-1 in combination with the engagement of the clutch C-1 achieves the second forward speed.

When the engagement pressure $P_{B1}$ is output from the linear solenoid valve SLB1 to the hydraulic servo 29 through the oil passage f1, the engagement pressure $P_{B1}$ is also input to the input port 26b of the signal check valve 26 through the oil passage f2, which branches off from a middle portion of the oil passage f1. The engagement pressure $P_{B1}$ is thus input to the input port 36d of the second shuttle valve 42 through the first shuttle valve 41 of the signal check valve 26 and the oil passage k1, and compared against the engagement pressure $P_{C1}$ input to the other input port 26c to determine which pressure is higher. The higher pressure among the engagement pressures $P_{B1}$, $P_{C1}$ is output as the signal pressure $P_{SIG}$ from the output port 26f and input to the oil chamber 22b of the primary regulator valve 22 through the oil passage k. The primary regulator valve 22 regulates the line pressure $P_L$ so as to be higher than the signal pressure $P_{SIG}$ by a predetermined amount.

Operation in Third Forward Speed

If the control unit determines that the state of the second forward speed has been switched to the third forward speed, for example, an electric command from the control unit causes the linear solenoid valve SLB1 to close and a pressure regulating control to be executed for the linear solenoid valve SLC2 while maintaining the regulated pressure state of the linear solenoid valve SLC1.

In other words, the pressure regulating control executed for the linear solenoid valve SLB1 causes a release control to be executed for the brake B-1, namely the engagement pressure $P_{B1}$ (operation pressure $P_{SLB1}$) of the hydraulic servo 29 of the brake B-1 is controlled to be discharged from the drain port EX of the linear solenoid valve SLB1 through the oil passage f1, and the brake B-1 released. The other linear solenoid valve SLC2 is regulated and controlled from a closed state in which the operation pressure $P_{SLC2}$ is zero, such that the control pressure $P_{SLC2}$ is output as the engagement pressure $P_{C2}$ from the output port SLC2*b* and input to the hydraulic servo 30 through the oil passages g1, g2, and the clutch C-2 engaged. Consequently, the engagement of the clutch C-2 in combination with the engagement of the clutch C-1 achieves the third forward speed.

Note that at this time, in the C-2 relay valve 37, the oil chamber 37*a* is input with the D-range pressure $P_C$, and the spool 37*p* is in the left-hand position. Therefore, the input port 37*c* communicates with the output port 37*d*, and the engagement pressure $P_{C2}$ is supplied from the output port 37*d* to the hydraulic servo 30 of the clutch C-2 through the oil passage g2.

When the engagement pressure $P_{C2}$ is output from the linear solenoid valve SLC2 to the hydraulic servo 30 through the oil passages g1, g2, the engagement pressure $P_{C2}$ is also input to the input port 26*a* of the signal check valve 26 through the oil passage g3, which branches off from middle portions of the oil passages g1, g2. In this state, the engagement pressure $P_{C2}$ rises and the engagement pressure $P_{B1}$ input to the input port 26*b* falls. This pressure difference causes the check ball 41*a* cutting off the input port 26*a* to move and cut off the input port 26*b* instead.

When the input port 26*b* is cut off, the input port 26*a* communicates with the output port 26*e* and the engagement pressure $P_{C2}$ is input to the input port 26*d* of the second shuttle valve 42 through the oil passage k1. Once the engagement pressure $P_{C2}$ is input to the input port 26*d*, the engagement pressure $P_{C2}$ and the engagement pressure $P_{C1}$ input to the other input port 26*c* opposingly act on the check ball 42*a*. The input port with the lower pressure is cut off by the check ball, while the input port with the higher pressure communicates with the output port 26*f* so that the higher pressure is input as the signal pressure $P_{SIG}$ to the oil chamber 22*b* of the primary regulator valve 22 through the oil passage k2. The primary regulator valve 22 thus regulates the line pressure $P_L$ so as to be higher than the signal pressure $P_{SIG}$ by a predetermined amount.

Operation in Fourth Forward Speed

If the control unit determines that the state of the third forward speed has been switched to the fourth forward speed, for example, an electric command from the control unit causes the linear solenoid valve SLC1 to close and a pressure regulating control to be executed for the linear solenoid valve SLB1 while maintaining the regulated pressure state of the linear solenoid valve SLC2.

In other words, the pressure regulating control executed for the linear solenoid valve SLC1 causes a release control to be executed for the clutch C-1, namely the engagement pressure $P_{C1}$ (operation pressure $P_{SLC1}$) of the hydraulic servo 27 of the clutch C-1 is controlled to be discharged from the drain port EX of the linear solenoid valve SLC1 through the oil passage e1, and the clutch C-1 released. The other linear solenoid valve SLB1 is regulated and controlled from a closed state in which the operation pressure $P_{SLB1}$ is zero, such that the control pressure $P_{SLB1}$ is output as the engagement pressure $P_{B1}$ from the output port SLB1*b* and input to the hydraulic servo 29 through the oil passage f1, and the brake B-1 engaged. Consequently, the engagement of the brake B-1 in combination with the engagement of the clutch C-1 achieves the fourth forward speed.

When the engagement pressure $P_{B1}$ is output from the linear solenoid valve SLB1 to the hydraulic servo 29 through the oil passage f1, the engagement pressure $P_{B1}$ is also input to the input port 26*b* of the signal check valve 26 through the oil passage f2, which branches off from a middle portion of the oil passage f1. In this state, the engagement pressure $P_{B1}$ and the engagement pressure $P_{C2}$ input to the other input port 26*a* opposingly act on the check ball. The input port with the lower pressure is cut off by the check ball 41*a*, while the input port with the higher pressure communicates with the output port 26*f* so that the higher pressure is input to the input port 26*d* of the second shuttle valve 42 through the oil passage k1.

Once this engagement pressure is input to the input port 26*d*, the engagement pressure $P_{C1}$ input to the other input port 26*c* starts to fall. The movement of the check ball 42*a* caused by this pressure difference cuts off the input port 26*c*, while the input port 26*d* communicates with the output port 26*f* so that this engagement pressure is input as the signal pressure $P_{SIG}$ to the oil chamber 22*b* of the primary regulator valve 22 through the oil passage k2. The primary regulator valve 22 thus regulates the line pressure $P_L$ so as to be higher than the signal pressure $P_{SIG}$ by a predetermined amount.

Operation in First Reverse Speed

When the driver operates the shift lever to the R-range position, for example, the R-range pressure $P_{REV}$ is output from the reverse-range pressure output port 21*c* of the manual shift valve 21 as described above. The R-range pressure $P_{REV}$ is then input to the hydraulic servo 32 of the clutch C-3 through the oil passage c1, the input port 36*c* of the B-3 relay valve 36 through the oil passage c2, and the oil chamber 35*b* of the B-3 control valve 35 through the oil passage c3. Once the R-range pressure $P_{REV}$ is supplied as the engagement pressure $P_{C3}$ to the hydraulic servo 32, the clutch C-3 is engaged.

If a shift lever sensor detects that the shift lever is in the R-range position and the control unit determines the R range as the shift lever position, the solenoid valve S1 is maintained in the off state and the B-3 relay valve 36 is maintained in the right-hand position by the biasing force of the spring 36*s*. The R-range pressure $P_{REV}$ input to the input port 36*c* is thus supplied to the hydraulic servo 31 of the brake B-3 through the output port 36*e* and the oil passage j, and the brake B-3 engaged. Consequently, the engagement of the brake B-3 in combination with the engagement of the clutch C-3 achieves the first reverse speed.

When the R range is determined as the shift lever position, the control unit outputs an electric command to the linear solenoid valve SLC2, such that the linear solenoid valve SLC2 regulates the line pressure $P_L$ directly input to the input port SLC2*a* through the oil passage a5 to the operation pressure $P_{SLC2}$ based on the throttle opening.

At such time, because the D-range pressure $P_D$ is not output to the oil chamber 37*a*, the C-2 relay valve 37 is in the right-hand position due to the biasing force of the spring 37*s*, and cuts off the input port 37*c*. The operation pressure $P_{SLC2}$ is thus not output to the hydraulic servo 30 of the clutch C-2, and only output to the input port 26*a* of the signal check valve 26 through the oil passages g1, g3.

Furthermore, during reverse travel, hydraulic pressure is not output to the other input ports 26*b*, 26*c* of the signal check valve 26. Therefore, the operation pressure $P_{SLC2}$ is output as the signal pressure $P_{SIG}$ from the output port 26*f* to the oil chamber 22*b* of the primary regulator valve 22, and the primary regulator valve 22 regulates the line pressure $P_L$ based on the signal pressure $P_{SIG}$ output from the linear solenoid valve SLC2.

By configuring the hydraulic control device 1 for an automatic transmission as described above, during forward travel the maximum operation pressure among the operation pressures of the linear solenoid valves SLC1, SLB1, SLC2 is output as the signal pressure $P_{SIG}$ from the signal check valve 26 to control the primary regulator valve 22. Meanwhile, during reverse travel the operation pressure $P_{SLC2}$ from the linear solenoid valve SLC2 is output as the signal pressure $P_{SIG}$ to control the primary regulator valve 22, whereby the hydraulic pressure from the oil pump 20 can be regulated to a suitable line pressure $P_L$ without providing a linear solenoid SLT for line pressure control. In addition, eliminating the linear solenoid valve SLT can achieve a cost reduction and a more compact device overall.

The combination of outputting the signal pressure $P_{SIG}$ from the linear solenoid SLC2 to the primary regulator valve 22 during reverse travel, and inputting the operation pressure $P_{SLC1}$, which is supplied to the hydraulic servo 27 of the clutch C-1 for which the engagement pressure $P_{C1}$ is higher than that for other clutches and brakes due the frequent use of the clutch C-1 and constant engagement at low speeds, to the input port 26c of the second shuttle valve 42 results in less switching of the signal pressure $P_{SIG}$ output to the primary regulator valve 22. Therefore, temporarily drops in the line pressure can be suppressed.

The linear solenoid valve SLC2 is directly input with the line pressure $P_L$ as the source pressure, and the operation pressure $P_{SLC2}$ can also be regulated during reverse travel. In addition, the C-2 relay valve 37 is interposed between the linear solenoid valve SLC2 and the hydraulic servo 30. Therefore, even if the operation pressure $P_{SLC2}$ is output as the signal pressure $P_{SIG}$ during reverse travel, the operation pressure $P_{SLC2}$ is cut off by the C-2 relay valve 37 so as to suppress supplying the operation pressure $P_{SLC2}$ to the hydraulic servo 30 of the clutch C-2 by mistake.

Note that in the embodiment described above, as an example, the hydraulic control device 1 for an automatic transmission according to the present invention was applied to an automatic transmission 3 capable of achieving four forward speeds and one reverse speed. However, the present invention is obviously not limited to this example, and may be applied to an automatic transmission that achieves six forward speeds, for example. The present invention may be applied to any automatic transmission, particularly if the automatic transmission has a reverse speed.

The hydraulic control device according to the present invention can be installed in an automatic transmission that is mounted in a vehicle such as a passenger car or a truck. The present invention is particularly well suited as a hydraulic control device of an automatic transmission for which smooth line pressure regulation is required while also achieving improved fuel consumption, reduced costs, and a more compact size. The present invention is also suitable as a hydraulic control device of an automatic transmission that regulates the line pressure without using a linear solenoid valve exclusively for controlling the primary regulator valve.

What is claimed is:

1. A hydraulic control device for an automatic transmission, comprising:
    a hydraulic pressure source;
    a plurality of friction engagement elements;
    a line pressure regulating valve that regulates hydraulic pressure from the hydraulic pressure source to a predetermined line pressure;
    a plurality of operation pressure regulating valves that regulate the line pressure as operation pressure for a hydraulic servo of the friction engagement element;
    a maximum pressure conducting circuit that guides a maximum pressure among the operation pressures regulated by the plurality of operation pressure regulating valves to the line pressure regulating valve, wherein
    the friction engagement elements are engaged and released to achieve a plurality of forward speeds and a reverse speed, and
    the line pressure regulating valve regulates the line pressure during forward travel based on the maximum operation pressure guided by the maximum pressure conducting circuit, and regulates the line pressure during reverse travel based on the operation pressure input from a specific operation pressure regulating valve among the plurality of operation pressure regulating valves.

2. The hydraulic control device for an automatic transmission according to claim 1, wherein
    each of the plurality of operation pressure regulating valves is an operation pressure regulating valve that outputs an operation pressure to the maximum pressure conducting circuit during forward travel, and
    the specific operation pressure regulating valve among the plurality of operation pressure regulating valves is an operation pressure regulating valve that is directly input with the line pressure and can output operation pressure to the maximum pressure conducting circuit even during reverse travel.

3. The hydraulic control device for an automatic transmission according to claim 2, wherein
    a switching valve is interposed between the specific operation pressure regulating valve and a hydraulic servo to which the operation pressure from the specific operation pressure regulating valve is output, and allows the operation pressure to be supplied to the hydraulic servo during forward travel and cuts off the supply of operation pressure to the hydraulic servo during reverse travel.

4. The hydraulic control device for an automatic transmission according to claim 3, further comprising:
    a range switching valve that is input with the line pressure and outputs the line pressure as one of a forward-range pressure and a reverse-range pressure depending on a range position, wherein
    the reverse speed is achieved by directly inputting the reverse-range pressure output from the range switching valve as an engagement pressure to the hydraulic servo of the friction engagement element.

5. The hydraulic control device for an automatic transmission according to claim 4, wherein
    the maximum pressure conducting circuit includes a plurality of shuttle valves in a hierarchical fashion with each shuttle valve having at least two input ports and one output port, and the output port communicates with the input port on the maximum pressure side among the input ports, wherein
    the maximum pressure conducting circuit is formed such that the operation pressure supplied to the hydraulic servo of the friction engagement element constantly engaged at a low speed among the plurality of friction engagement elements can be output, by one input to the shuttle valve, as the maximum operation pressure to the line pressure regulating valve.

6. The hydraulic control device for an automatic transmission according to claim 3, wherein
    a switching valve is interposed between the specific operation pressure regulating valve and a hydraulic servo to which the operation pressure from the specific operation pressure regulating valve is output, and allows the operation pressure to be supplied to the hydraulic servo during forward travel and cuts off the supply of operation pressure to the hydraulic servo during reverse travel.

7. The hydraulic control device for an automatic transmission according to claim 6, further comprising:
a range switching valve that is input with the line pressure and outputs the line pressure as one of a forward-range pressure and a reverse-range pressure depending on a range position, wherein
the reverse speed is achieved by directly inputting the reverse-range pressure output from the range switching valve as an engagement pressure to the hydraulic servo of the friction engagement element.

8. The hydraulic control device for an automatic transmission according to claim 7, wherein
the maximum pressure conducting circuit includes a plurality of shuttle valves in a hierarchical fashion with each shuttle valve having at least two input ports and one output port, and the output port communicates with the input port on the maximum pressure side among the input ports, wherein
the maximum pressure conducting circuit is formed such that the operation pressure supplied to the hydraulic servo of the friction engagement element constantly engaged at a low speed among the plurality of friction engagement elements can be output, by one input to the shuttle valve, as the maximum operation pressure to the line pressure regulating valve.

9. The hydraulic control device for an automatic transmission according to claim 1, wherein
the maximum pressure conducting circuit includes a plurality of shuttle valves in a hierarchical fashion with each shuttle valve having at least two input ports and one output port, and the output port communicates with the input port on the maximum pressure side among the input ports, wherein
the maximum pressure conducting circuit is formed such that the operation pressure supplied to the hydraulic servo of the friction engagement element constantly engaged at a low speed among the plurality of friction engagement elements can be output, by one input to the shuttle valve, as the maximum operation pressure to the line pressure regulating valve.

* * * * *